Sept. 10, 1963  A. B. MARMO  3,103,612
SOLENOID OPERATED VALVE
Filed Oct. 14, 1960  2 Sheets-Sheet 1

INVENTOR
ANTHONY B. MARMO

BY
ATTORNEY

Sept. 10, 1963     A. B. MARMO     3,103,612
SOLENOID OPERATED VALVE

Filed Oct. 14, 1960     2 Sheets-Sheet 2

INVENTOR
ANTHONY B. MARMO
BY
ATTORNEY

United States Patent Office 3,103,612
Patented Sept. 10, 1963

3,103,612
SOLENOID OPERATED VALVE
Anthony B. Marmo, Pompano Beach, Fla., assignor to Ranco Incorporated, Columbus, Ohio, a corporation of Ohio
Filed Oct. 14, 1960, Ser. No. 62,578
3 Claims. (Cl. 317—178)

The present invention relates to an improvement in solenoid operated liquid control valves in which a solenoid attracted armature actuates a valve member.

The principal object of the invention is the provision of an improved solenoid operated liquid control valve in which an armature reciprocates in a liquid filled sleeve or the like for controlling a valve mechanism, the armature being shifted to a stop by the magnetic flux of the solenoid, and means being provided for cushioning the movement of the armature as it approaches the stop to prevent undue shock and noise.

More particularly, it is an object of the present invention to provide an improved solenoid operated valve mechanism including a valve actuating armature which reciprocates between limits in a liquid filled sleeve in response to the energization and deenergization of the solenoid, the travel of the armature in one direction being cushioned by a shock absorbing mechanism comprising a ring-like member loosely surrounding the armature and having a close sliding fit with the inside walls of the sleeve, so that liquid may pass freely between the ring and armature but is restricted in passing between the ring and sleeve walls, the armature having two spaced abutments, one of which is an annular shoulder, between which the ring is loosely disposed so that when the armature moves in opposite directions its initial travel is independent of the ring and upon engagement of the member by the annular shoulder the passage between the ring and armature is blocked by engagement of the ring and shoulder, thereby trapping liquid in the end of the sleeve toward which the armature is traveling which cushions movement of the armature as it approaches one of its limits.

Other objects and advantages of the invention will be apparent from the following description of a preferred form thereof, reference being made to the accompanying drawings wherein.

Figure 1:
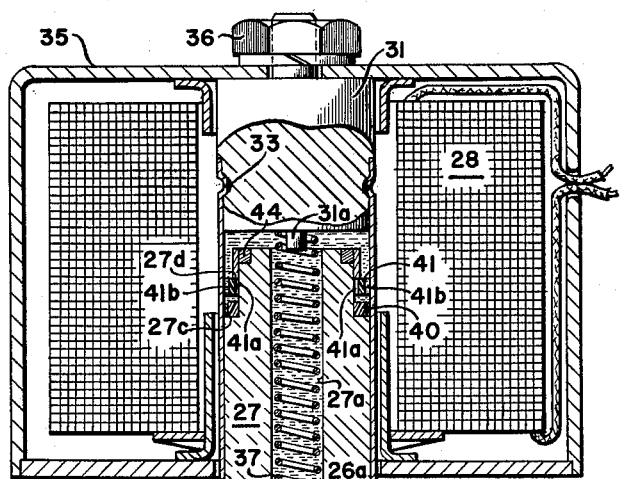
FIG. 1 is a sectional view of a solenoid operated water valve embodying the invention, the valve being shown in its closed position, with the solenoid not energized.

In the form of the invention shown, a water valve is provided comprising a body 10 having an inlet 11, an outlet 12, and a liquid passage between the inlet and outlet includes an inlet chamber 13 leading into an annular chamber 14 in which a centrally located outlet valve port 15 is formed. Port 15 includes an outlet passage 16 which leads to outlet 12.

Port 15 is arranged to be closed by a valve member comprising a disc 20, which may be formed of plastic material such as Teflon (tetraethylfluorine), and which is suitably attached to a hollow bushing 21. Valve member 20 is moved to and from port 15 by operation of a flexible diaphragm 22, which has a rim portion 22d pressed to an annular shoulder about the top of chamber 14 by a cap 23 threaded on the top portion of body 10 so that the rim of the diaphragm provides a leak proof seal between the walls of the valve body and the cap. The diaphragm likewise divides chamber 14 into lower and upper sections 14a and 14b, respectively. Two rigid discs 24 and 25 are disposed on opposite sides of diaphragm 22 to lend rigidity thereto for positively operating valve member 20. As seen in the drawings, a bushing 21 is provided centrally of the diaphragm and has shoulders between which discs 24 and 25, as well as the interposed diaphragm 22, are crimped by turning a portion 21a onto plate 25. Diaphragm 22 has two concentric convolutions 22b and 22c formed therein and convolution 22c cooperates with disc 25 to form an annular passage 22d.

Diaphragm 22 moves disc 20 to and from port 15 by changes in pressure differential on opposite sides thereof, which differential is controlled by means including a bleed opening 22e through the wall of convolution 22c to provide an inlet to annular passage 22d. A channel 22f is formed in diaphragm 22, 180° from bleed opening 22e and extends radially thereof and beyond the edge of plate 25 to provide an outlet from passage 22d into the upper chamber 14b. The purpose of this outlet fluid passage arrangement is to provide a controlled leakage of liquid between the lower and upper sections 14a, 14b respectively, as is described more fully hereinafter. It is to be understood that the novel features of the bleed passage arrangements just described is the subject of my co-pending patent application, Ser. No. 62,689, filed October 14, 1960.

Bushing 21 has an upwardly projecting stem portion 21b through which axial bore 21c is formed, the diameter of which is substantially greater than bleed opening 22e so that the rate of liquid discharge through the bore is greater than the rate of liquid passage through bleed opening 22e and passage 22d. The upper end of stem 21b forms a valve seat or port 21d which controls the flow of liquids downwardly through bore 21c and is hereinafter referred to as the pilot port. This pilot port is arranged to be controlled by a pilot valve member 26 which is moved to and from the pilot port by an armature 27 which is actuated by a solenoid 28, as is described more fully hereinafter.

Armature 27 is enclosed in a sleeve 29 of non-magnetic metal which has its lower end hermetically connected with cap 23 by a bushing 30 welded or brazed to the cap and sleeve, as shown. The lower end of the sleeve is in open communication with the interior of chamber section 14b and the upper end of the sleeve is closed by a plug 31 which is brazed in the sleeve as at 33.

Solenoid 28 includes an iron frame 35 to provide a suitable flux path such that when the solenoid is energized armature 27 is attracted against the bottom surface of plug 31 which forms a limiting stop. Frame 35 is attached to plug 31 by a nut 36 threaded on a stem which projects upwardly from plug 31 through an opening in the frame. The armature is non-circular, preferably hexagonal, to permit free passage of liquid therearound and to minimize friction with the sleeve as it reciprocates.

Pilot valve member 26 is preferably formed of suitable rubber-like material which is retained in an enlarged section 27b in an axial opening 27a through armature 27. The armature is yieldingly urged to move valve member 26 to port 21d by a coil spring 37 centered in opening 27a by a pin portion 31a depending from the bottom surface of plug 31 and a similar pin 26a formed on the upper surface of the pilot valve member.

Figure 7:
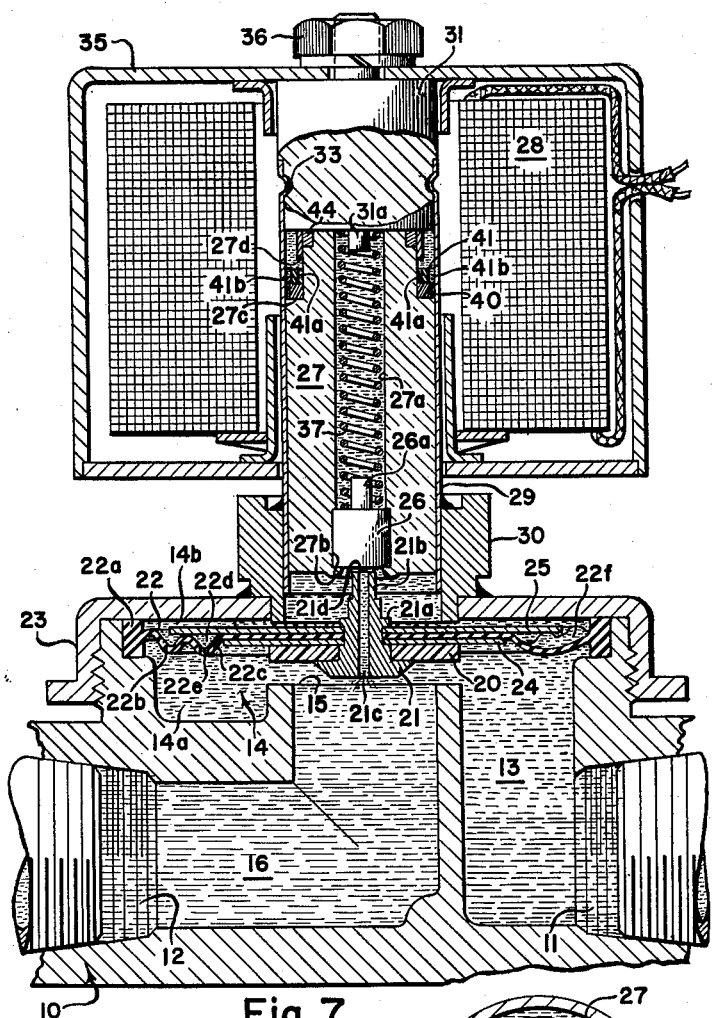
FIG. 7 is a sectional view similar to FIG. 1 but showing the valve in its open position with the solenoid energized.

Liquid control valves of the general type described, with exception of the bleed passage arrangement 22d, 22e, etc., are old and well known in the art, and it operates as follows:

Inlet 11 is connected with the source of liquid under pressure and outlet 12 is connected to a lower pressure area. The high pressure liquid enters inlet passage 13 and occupies annular chamber 14, passing upwardly into section 14b and sleeve 29 through bleed opening 22e, passage 22d and channel 22f to the upper side of diaphragm 22. If pilot port 21d is closed, liquid cannot flow through opening 21c into outlet passage 16, and consequently the pressure of the liquid on the upper side of diaphragm 25 is greater than the pressure on the lower side, since the portion of the lower side exposed to port 15 is at a lower pressure and valve member 20 is firmly pressed to port 15. To remove valve member 20 from valve port 15, solenoid 28 is energized which raises armature 27 to plug 31 which removes valve member 26 from pilot port 21d which permits liquid to flow from the upper side of diaphragm 22 to outlet 12 at a greater rate than liquid enters chamber section 14b, bleed opening 22e, etc., consequently the pressure above diaphragm 22 is reduced below that on the lower side which causes the incoming liquid pressure on the diaphragm to move valve member 20 from its port, as seen in FIG. 7. In many cases the valve is employed in inhabited quarters where it is desirable that there be a minimum of noise, such as for controlling the flow of fluid through heating or cooling radiators in dwellings or buildings. Heretofore, valves of the general arrangement described have been objectionable in that when the valve is energized the armature striking its upper stop causes a sharp and unpleasant noise. My invention relates to an improved armature structure and movement dampener by which this objectionable noise is eliminated, and in the form shown the armature is hexagonal in cross section to permit free passage of liquid from one end of sleeve 29 to the other as the armature moves in the sleeve. The upper end of armature 27 is reduced in diameter to provide an appreciable annular space between the inside walls of sleeve 29 and this portion of the armature, and, in addition forms an upwardly facing annular shoulder 27c. A hexagonal cap is press fitted to the upper end of the reduced portion of the armature to provide a downwardly facing annular shoulder 27d. In the form of the invention shown, a ring 44, preferably of copper, is disposed about the upper end of armature 27 adjacent to the band 27d to provide a shading ring to reduce or substantially eliminate humming noises. This expedient is old and well known in the art, and does not necessarily form a part of the invention.

Figure 4:
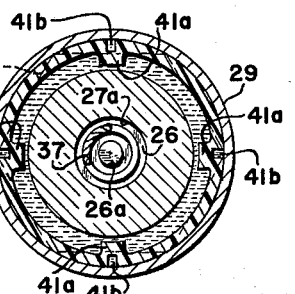
FIG. 4 is a view taken along line 4—4 of FIG. 2 and on a larger scale.
Figure 8:
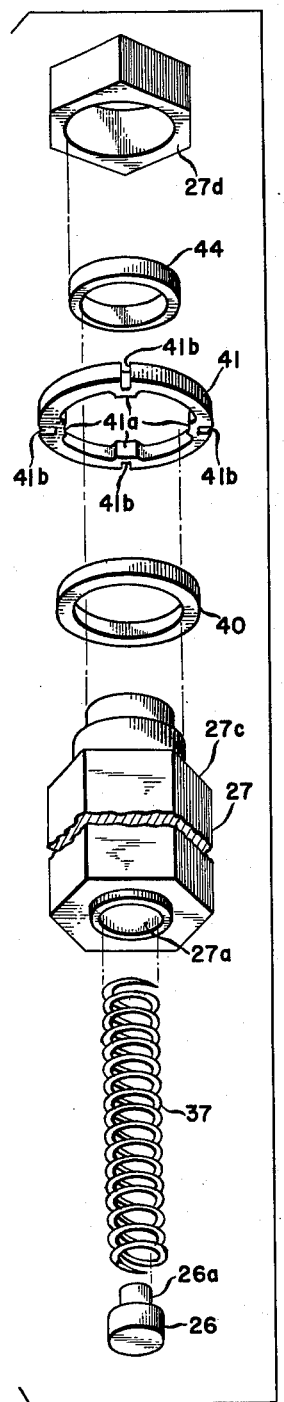
FIG. 8 is an exploded view of the armature assembly of the valve.
Figure 5:
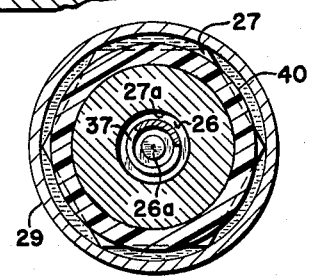
FIG. 5 is a sectional view taken along line 5—5 of FIG. 2 but on a larger scale.

Disposed between shoulders 27c and 27d are two annular rings 40 and 41, which are preferably made of a non-corroding and relatively pliable material, such as Teflon (tetraethylfluorine) or nylon. The material forming ring 40 is approximately square in cross-section and as shown in FIG. 5 it has a press fit with the armature to block any flow of liquid therebetween and a relatively loose fit with the inside walls of sleeve 29. Ring 41 has a relatively close fit with the inside walls of sleeve 29 as shown in FIG. 4 and has a tendency to remain in frictional engagement therewith although it may slide longitudinally in the sleeve under the action of armature 27, as described more fully hereinafter. The major inside surface of ring 41 is relatively widely spaced from armature 27 to provide relatively free flow of liquid therebetween and is centered relative to the armature by inwardly projecting lugs 41a. To accommodate expansion of ring 41, which may occur in the event of wide changes in temperature of the liquid surrounding the armature, etc., slots 41b are formed about the outer periphery of the ring. These slots should be somewhat limited in cross-sectional area so as to present relatively substantial restriction against the flow of liquid therethrough. As is most clearly seen in FIG. 6, the width of ring 40 is such that when the two rings are abutting one another, as when armature 27 is moved upwardly, the passage opening formed between the armature and the inside of ring 41 is closed or substantially closed by ring 40 abutting ring 41.

The operation of the damper structure is as described hereinafter.

Figure 2:
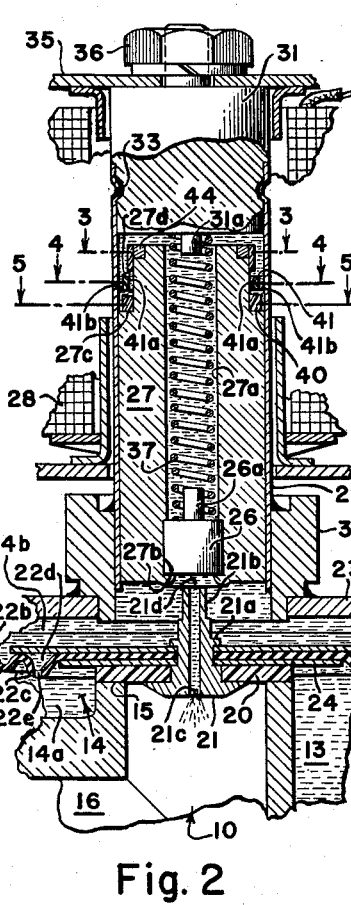
FIG. 2 is a fragmentary sectional view of the valve shown in FIG. 1 but with the solenoid energized and the valve starting to open.
Figure 6:
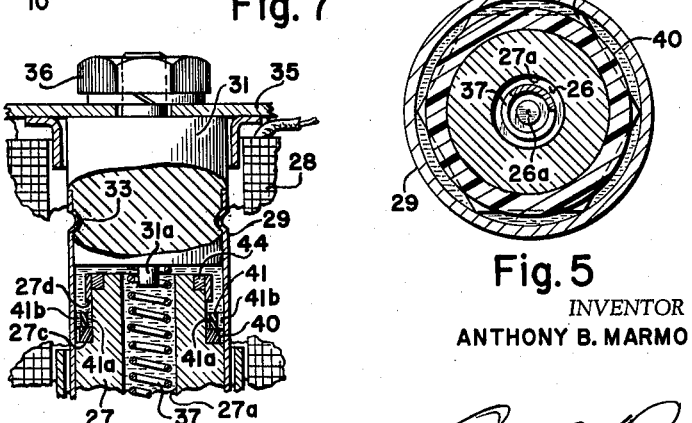
FIG. 6 is a fragmentary sectional view of the valve shown in FIG. 1 showing the solenoid energized and the valve almost fully open.

With solenoid 28 deenergized, armature 27 is in its lower position with pilot valve member 26 closing pilot port 21d, ring 41 against shoulder 27d, and ring 40 against shoulder 27c. In FIG. 1 it will be seen that a substantial space exists between the two rings, but this space should be slightly less than the stroke of the armature. When solenoid 28 is energized armature 27 is rapidly drawn upwardly to remove valve member 26 from the pilot port, and liquid above the armature flows downwardly relatively freely through the spaces between the armature and ring 41 and between ring 40 and sleeve 29, as shown in FIG. 2. Slightly before the top of the armature engages plug 31, ring 40 engages the bottom side of ring 41, as shown in FIG. 6, thereby substantially blocking the passage of liquid through the spaces between the armature and ring 41 and between ring 40 and sleeve 29. The liquid thus trapped must pass between ring 41 and sleeve 29, and since this path affords a high resistance to flow, the rate of further movement of the armature in its approach to plug 31 is markedly reduced and it is caused to lightly engage the stop without the usual sharp pounding noise. It will be noted that when armature 27 initially moves upwardly, ring 41 remains unmoved due to its frictional engagement with the sides of sleeve 29, and shoulder 27c carries ring 40 upwardly against ring 41, causing the latter to then slide along sleeve 29 until the armature engages plug 31.

Figure 3:
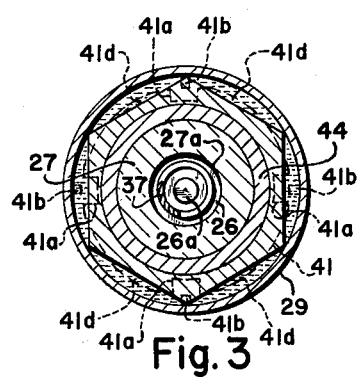
FIG. 3 is a sectional view taken along line 3—3 of FIG. 2 and on a larger scale.

When solenoid 28 is deenergized, armature 27 immediately moves from plug 31 downwardly, carrying ring 40 therewith which separates from ring 41, which is retained in frictional engagement with the inside wall of sleeve 29, and after some downward movement of the armature, shoulder 27d engages ring 41 and moves it downwardly. It can be seen in FIG. 3 that ring 41 does not seal against shoulder 27d because the dimension across the flats of the hexagonal cap is less than the inside diameter of ring 41, so that liquid flows freely into the upper portion of sleeve 29 through the openings 41d. The space between ring 40 and shoulder 27d is such that when the armature is in its lowermost position, the space between the rings is somewhat less than the stroke of the armature. It will be seen that by my novel combination the movement of armature 27 upwardly is free until nearly the end of its stroke whereupon the liquid cushioning effect thereon is effected by ring 40 closing the passage inside ring 41 and that on the downward stroke free passage for the fluid exists at all times regardless of the location of damper ring 41. This action assures a positive armature movement for initiating a valve opening while at the same time objectionable pounding or hammering noises of the armature are eliminated, and also assures an unrestrained motion of the armature to initiate valve closing.

It will be understood that while I have shown but one form of the invention, other forms, modifications and adaptations could be made, all falling within the scope of the claims which follow.

I claim:

1. Actuating means of the character described comprising a housing including a sleeve portion open at one end to said housing and closed at the opposite end, an armature non-circular in cross-sectional configuration and reciprocable in said sleeve between limits, a solenoid associated with said sleeve for actuating said armature, an annular member surrounding said armature and spaced appreciably therefrom to form a fluid passage from one side of said member to the other and having a sliding frictional fit with the inside walls of the said sleeve, means forming an annular shoulder about said armature and spaced from the walls of said sleeve to provide a fluid passage therebetween and having a relatively close fit with said armature to prevent an appreciable passage of fluid therebetween, said annular shoulder adapted to abut and move said annular member in one direction and to substantially close the fluid passage through said annular member during such movement, and means forming a lost motion connection between said armature and said annular member whereby when said armature moves in a direction to separate said annular shoulder from said annular member the latter is held stationary by said frictional fit until said annular shoulder is spaced therefrom a distance less than the stroke of said armature.

2. Actuating means as defined in claim 1 in which said first annular member has at least one slot in its periphery to permit expansion of said member without materially increasing its frictional engagement with the interior of said sleeve.

3. Actuating means of the character described comprising a fluid containing housing including a sleeve portion open at one end to said housing and closed at the opposite end, an armature reciprocable in said sleeve between first and second limits, a solenoid associated with said sleeve for actuating said armature, a first annular member loosely surrounding said armature and having a sliding friction fit with the inside wall of said sleeve, a second annular member surrounding said armature and movable axially therewith relative to said first annular member, said second annular member being adapted to engage and move said first annular member during movement of said armature from one of said limits to the other, said annular members having fluid passages formed thereabout and said members being so aligned that when engaging one another at least one of said fluid passages is substantially closed, said first annular member being held by said friction fit against movement with said second member during initial return movement of said armature from said other limit toward said one limit, and means providing a lost motion connection between said armature and said first member, said means being operative on said first member to overcome said friction fit and move said first member with said armature after said initial return movement so that when said armature is in said one position said first and second annular members are spaced apart a distance less than the distance of movement of said armature between said limits.

References Cited in the file of this patent
UNITED STATES PATENTS 1,730,688   Rippl ------------------ Oct. 8, 1929
2,936,997   Nickells -------------- May 17, 1960